(12) United States Patent
Xu et al.

(10) Patent No.: US 11,853,368 B2
(45) Date of Patent: Dec. 26, 2023

(54) METHOD AND SYSTEM FOR IDENTIFYING AND DISPLAYING AN OBJECT

(71) Applicant: HANGZHOU GLORITY SOFTWARE LIMITED, Zhejiang (CN)

(72) Inventors: Qingsong Xu, Zhejiang (CN); Qing Li, Zhejiang (CN)

(73) Assignee: HANGZHOU GLORITY SOFTWARE LIMITED, Zhejiang (CN)

( * ) Notice: Subject to any disclaimer, the term of this patent is extended or adjusted under 35 U.S.C. 154(b) by 0 days.

(21) Appl. No.: 16/661,504

(22) Filed: Oct. 23, 2019

(65) Prior Publication Data

US 2021/0011945 A1    Jan. 14, 2021

(30) Foreign Application Priority Data

Jul. 10, 2019  (CN) .......................... 201910617332.7

(51) Int. Cl.
*G06F 3/048* (2013.01)
*G06F 16/93* (2019.01)
(Continued)

(52) U.S. Cl.
CPC ............ *G06F 16/93* (2019.01); *G06F 16/538* (2019.01); *G06F 16/5854* (2019.01);
(Continued)

(58) Field of Classification Search
None
See application file for complete search history.

(56) References Cited

U.S. PATENT DOCUMENTS

| 5,918,226 A * | 6/1999 | Tarumi | G06Q 10/10 |
| | | | 707/999.102 |
| 8,549,436 B1 * | 10/2013 | Capriati | G06F 3/0486 |
| | | | 715/776 |

(Continued)

FOREIGN PATENT DOCUMENTS

| CN | 103400147 A | 11/2013 |
| CN | 103617417 A | 3/2014 |

(Continued)

OTHER PUBLICATIONS

First Office Action dated Sep. 24, 2020 from corresponding Chinese Patent Application No. 201910617332.7 (22 pages including English translation).

(Continued)

*Primary Examiner* — Hua Lu
(74) *Attorney, Agent, or Firm* — Crowell & Moring LLP; John C. Freeman (57) ABSTRACT

A method is disclosed. The method may include: acquiring an image including at least a part of an object; identifying the object based on the image; searching a document database for a document corresponding to the object; and displaying the object and information related to the document. A system is disclosed. The system may include: one or more memories configured to store a document database; one or more electronic devices configured to acquire an image including at least a part of an object; and one or more computing devices configured to identify the object based on the image, and search the document database for a document corresponding to the object, wherein the one or more electronic devices are further configured to display the object and information related to the document.

19 Claims, 5 Drawing Sheets

(51) Int. Cl.
*G06F 16/583* (2019.01)
*G06F 16/538* (2019.01)
*G06V 10/764* (2022.01)
*G06V 10/82* (2022.01)
*G06V 20/20* (2022.01)

(52) U.S. Cl.
CPC ............ *G06V 10/764* (2022.01); *G06V 10/82* (2022.01); *G06V 20/20* (2022.01)

(56) References Cited

U.S. PATENT DOCUMENTS

| | | | | |
|---|---|---|---|---|
| 8,577,616 | B2* | 11/2013 | Dunlap | G01N 33/0098 703/11 |
| 9,264,480 | B1* | 2/2016 | Saylor | H04L 67/06 |
| 9,298,978 | B1 | 3/2016 | Hlatky et al. | |
| 9,527,115 | B2 | 12/2016 | LaRose et al. | |
| 9,779,442 | B1* | 10/2017 | Cimic | G06Q 30/0643 |
| 10,262,244 | B2* | 4/2019 | Yamaguchi | A01G 7/00 |
| 10,664,722 | B1* | 5/2020 | Sharma | G06N 3/045 |
| 10,706,113 | B2 | 7/2020 | Lundin et al. | |
| 11,612,148 | B2 | 3/2023 | Naval, Jr. et al. | |
| 2005/0076012 | A1* | 4/2005 | Manber | G06Q 30/02 |
| 2006/0075327 | A1* | 4/2006 | Sriver | G06F 16/93 715/251 |
| 2006/0190489 | A1* | 8/2006 | Vohariwatt | G06Q 10/00 |
| 2006/0212435 | A1* | 9/2006 | Williams | G06F 16/9538 707/E17.022 |
| 2007/0219970 | A1* | 9/2007 | Dunie | G06F 16/58 |
| 2009/0063431 | A1* | 3/2009 | Erol | G06V 10/993 |
| 2010/0177964 | A1* | 7/2010 | King | G06F 16/41 382/177 |
| 2010/0306260 | A1* | 12/2010 | Dejean | G06V 30/416 707/811 |
| 2011/0128288 | A1* | 6/2011 | Petrou | G06V 10/235 345/428 |
| 2012/0005225 | A1* | 1/2012 | Chidlovskii | G06F 16/3323 707/769 |
| 2013/0054595 | A1* | 2/2013 | Isaev | G06V 30/416 707/736 |
| 2013/0297670 | A1* | 11/2013 | Lundberg | H04W 4/029 709/201 |
| 2014/0122479 | A1* | 5/2014 | Panferov | G06V 30/416 707/736 |
| 2015/0161569 | A1* | 6/2015 | Shoham | G06Q 10/1093 705/7.18 |
| 2015/0169572 | A1* | 6/2015 | Taubman | G06F 16/5854 707/723 |
| 2015/0347544 | A1* | 12/2015 | Caraballoso | G06F 3/0482 707/738 |
| 2016/0239722 | A1* | 8/2016 | Warren | G06V 30/142 |
| 2016/0275376 | A1* | 9/2016 | Kant | G06F 18/2415 |
| 2016/0342312 | A1* | 11/2016 | Jiang | G06F 3/04815 |
| 2017/0139548 | A1* | 5/2017 | De Las Heras | G06F 3/0485 |
| 2017/0193545 | A1* | 7/2017 | Zhou | G06Q 30/0254 |
| 2018/0084772 | A1 | 3/2018 | Peeters et al. | |
| 2018/0189609 | A1* | 7/2018 | Park | G06F 18/41 |
| 2018/0196881 | A1* | 7/2018 | Lundin | G06F 16/9535 |
| 2018/0322353 | A1* | 11/2018 | Ralls | G06F 16/51 |
| 2018/0349699 | A1* | 12/2018 | O'Connell | G01C 21/3438 |
| 2019/0073560 | A1* | 3/2019 | Matei | G06N 3/08 |
| 2019/0080146 | A1* | 3/2019 | Santamaria-Pang | G06V 10/774 |
| 2019/0163695 | A1* | 5/2019 | Castleberry | G06F 16/953 |
| 2019/0318405 | A1* | 10/2019 | Hu | G06V 20/00 |
| 2020/0034615 | A1* | 1/2020 | Croxford | G06N 3/045 |
| 2020/0050706 | A1* | 2/2020 | Milman | G09B 23/40 |
| 2020/0226360 | A1* | 7/2020 | Bouchard | A01M 31/002 |
| 2020/0372047 | A1* | 11/2020 | Wu | G06F 16/587 |
| 2020/0410298 | A1* | 12/2020 | Murali | G06F 18/24 |
| 2021/0004589 | A1* | 1/2021 | Turkelson | G06V 10/82 |
| 2021/0011945 | A1 | 1/2021 | Xu et al. | |
| 2021/0027514 | A1* | 1/2021 | Kwon | G06F 16/5854 |
| 2021/0142097 | A1* | 5/2021 | Zheng | G06N 3/08 |
| 2021/0289759 | A1 | 9/2021 | Naval, Jr. et al. | |

FOREIGN PATENT DOCUMENTS

| | | |
|---|---|---|
| CN | 104850836 A | 8/2015 |
| CN | 103093247 B | 5/2016 |
| CN | 106294527 A | 1/2017 |
| CN | 107239514 A | 10/2017 |
| CN | 107463570 A | 12/2017 |
| CN | 108363970 A | 8/2018 |
| CN | 108984576 A | 12/2018 |
| CN | 108985285 A | 12/2018 |
| CN | 110321868 A | 10/2019 |
| WO | WO 2018/111124 A2 | 6/2018 |

OTHER PUBLICATIONS

International Search Report dated Sep. 23, 2020 (6 pages including English translation) out of corresponding PCT/CN2020/098845.

Written Opinion dated Sep. 23, 2020 (9 pages including English translation) out of corresponding PCT/CN2020/098845.

Second Office Action dated Mar. 24, 2021 (23 pages including English translation) out of Chinese priority application 201910617332.7.

Rejection Decision dated May 18, 2021 (22 pages including English translation) out of Chinese prioirty application 201910617332.7.

International Preliminary Report on Patentability dated Jan. 11, 2022 (5 pages, foreign text) out of corresponding PCT/CN2020/098845.

* cited by examiner

METHOD AND SYSTEM FOR IDENTIFYING AND DISPLAYING AN OBJECT

CROSS-REFERENCE TO RELATED APPLICATIONS

This application claims priority under 35 U.S.C. § 119 to Chinese Patent Application No. 201910617332.7, filed on Jul. 10, 2019, the entire contents of which are hereby incorporated by reference.

TECHNICAL FIELD

The present disclosure relates to the field of computer technology, and in particular, to a method and a system for object identification and display.

BACKGROUND

In the field of computer technology, there are various applications for object identification, such as applications for identifying animals, plants, persons, scenery, nature, buildings, goods, foods, medicines, commodities, and the like.

SUMMARY

One of aims of the present disclosure is to provide a method and a system for object identification and display.

According to a first aspect of the present disclosure, there is provided a method. The method may include: acquiring an image including at least a part of an object; identifying the object based on the image; searching a document database for a document corresponding to the object; and displaying the object and information related to the document.

According to a second aspect of the present disclosure, there is provided a system. The system may include: one or more memories configured to store a document database; one or more electronic devices configured to acquire an image including at least a part of an object; and one or more computing devices configured to identify the object based on the image, and search the document database for a document corresponding to the object, wherein the one or more electronic devices are further configured to display the object and information related to the document.

Further features of the present disclosure and advantages thereof will become apparent from the following detailed description of exemplary embodiments with reference to the attached drawings.

BRIEF DESCRIPTION OF THE DRAWINGS

The accompanying drawings, which constitute a part of the specification, illustrate embodiments of the present disclosure and, together with the description, serve to explain the principles of the present disclosure.

The present disclosure will be better understood according the following detailed description with reference of the accompanying drawings.

Note that, in the embodiments described below, in some cases the same portions or portions having similar functions are denoted by the same reference numerals in different drawings, and description of such portions is not repeated. In some cases, similar reference numerals and letters are used to refer to similar items, and thus once an item is defined in one figure, it need not be further discussed for following figures.

DETAILED DESCRIPTION

Various exemplary embodiments of the present disclosure will be described in details with reference to the accompanying drawings in the following. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit this disclosure, its application, or uses. It should be understood by those skilled in the art that, these examples, while indicating the implementations of the present disclosure, are given by way of illustration only, but not in an exhaustive way.

Techniques, methods and apparatus as known by one of ordinary skill in the relevant art may not be discussed in detail, but are intended to be regarded as a part of the specification where appropriate.

The inventors of the present application have studied and analyzed current methods and systems for object identification, such as current applications for object identification, and analyzed user expectations for these applications. The inventors have found that when using these applications for object identification, the user is often not familiar with the object being identified, but is interested in knowing the object more. Current applications for object identification typically provide the user with only a name (e.g., when the object is a plant, the name may include a scientific name and/or an alternative name) and/or classification (e.g., when the object is a plant, the classification may include a botanical classification) of the object, which is inconvenient for the user to learn the object in depth (e.g., when the object is a plant, to learn a difference between the plant and a similar plant, a distribution, a medicinal/edible value, etc. of the plant). The inventors have also found that more, more accurate, and/or more useful information about the identified object may typically be found in various documents. The documents may be, for example, books, papers, journals, manuals, or the like.

Figure 1:
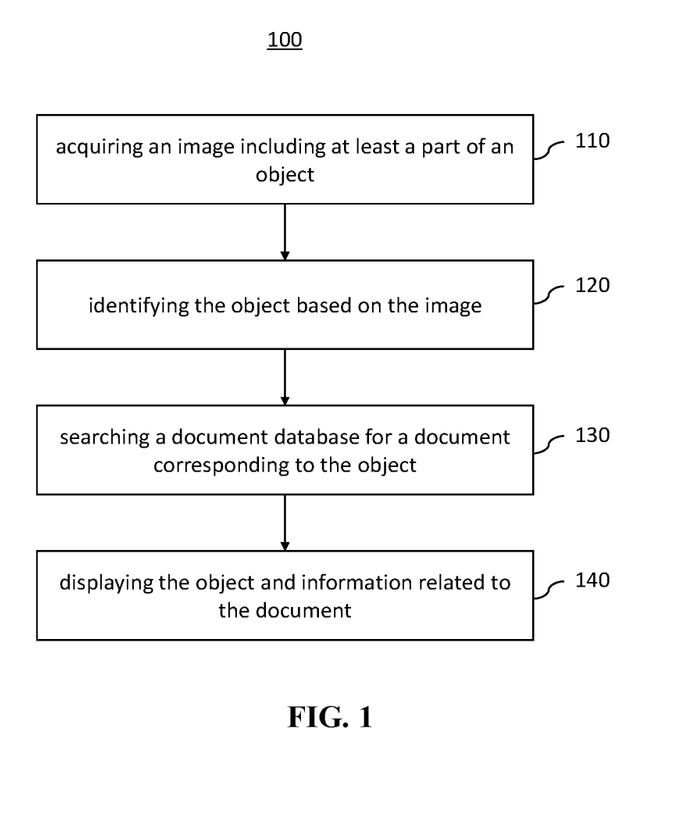
FIG. 1 is a flow chart schematically illustrating at least a portion of a method according to an embodiment of the present disclosure.

Referring to FIG. 1, a method 100 according to an embodiment of the present disclosure is shown. The method 100 includes the following steps.

Step 110 includes acquiring an image capable of presenting at least a part of an object. The image may include any form of visual presentation such as a photograph or video, etc. The image capable of presenting at least a part of the object means that the acquired image includes a whole or a part of the object that is desired to be identified. The image may be acquired by, for example, an image acquisition device. The image acquisition device may include a camera, an imaging module, an image processing module, and the like. Alternatively, the image acquisition device may include a communication module for receiving or downloading the image. Accordingly, a manner in which the image acquisition device acquires the image may include taking a photo or video, receiving or downloading a photo or video, and the like.

Step 120 includes identifying the object presented in the image based on the image. The identification in this step may be performed by any known method for object identification based on the image. For example, a classification of the object (as for a plant or an animal, a species of the object) may be identified by a computing device and a trained classification identification model.

Taking a plant object as an example, the trained classification identification model may be established based on a neural network for identifying a classification of a plant. The process of establishing the trained classification identification model is described as follows. A certain number of image samples labelled with corresponding information are acquired for each plant species. The number of the image samples prepared for each plant species may be equal or unequal. The corresponding information labeled for each image sample may include a name of the plant in the image sample (including a scientific name, an alternative name, and a category name of the botanical classification, etc.). The image samples acquired for each plant species may include images of the plant of that species at different shooting angles, different lighting conditions, different seasons (e.g., the same plant may have different morphologies in different seasons), different times (e.g., the same plant may have different morphologies in the morning and at night of each day), different growing environments (e.g., a plant growing indoors may have different morphologies from those of a plant of the same species growing outdoors), different geographical locations (e.g., plants of the same species may have different morphologies growing in different geographical locations), as much as possible. In these cases, the corresponding information labeled for each image sample may also include information about the shooting angles of photos, and lighting conditions, seasons, times, growth environments, geographic locations or the like of the image sample.

The image samples subjected to the labeling process are divided into a training sample set for training a classification identification model and a test sample set for testing training results. Typically, the number of samples in the training sample set is significantly greater than the number of samples in the test sample set, e.g., the number of samples in the test sample set accounts for 5% to 20% of the number of total image samples, and the number of samples in the training sample set accounts for 80% to 95% of the number of total image samples accordingly. Those skilled in the art will appreciate that the number of samples within the training or testing sample set may be adjusted as desired.

The neural network is trained using the training sample set, and an output accuracy of the trained neural network is tested using the test sample set. If the output accuracy does not meet the requirement, the number of the image samples in the training sample set is increased, and the neural network will be trained again using an updated training sample set until the output accuracy of the trained neural network meets the requirement. If the output accuracy meets the requirement, the training ends. In this way, the trained neural network with an output accuracy meeting the requirement may be used as the trained classification identification model in the step 120.

The neural network may include, for example, a deep convolution neural network (CNN) or a deep residual network (Resnet). The deep convolution neural network is a deep feedforward neural network, which scans a plant image using a convolution kernel, extracts a feature to be identified in the plant image, and further identifies the feature to be identified of the plant. In addition, in the process of identifying the plant image, an original plant image may be directly input into the deep convolution neural network model without preprocessing the plant image. Compared with other identification models, the deep convolution neural network model has higher identification accuracy and identification efficiency. Compared with the deep convolution neural network model, the deep residual network model is additionally provided with an identity mapping layer, which may avoid the phenomenon of saturation or even reduction of the accuracy caused by the convolution neural network as the network depth (the number of laminated layers in the network) increases. An identity mapping function of the identity mapping layer in the residual network model needs to satisfy the following condition: a sum of the identity mapping function and an input of the residual network model is equal to an output of the residual network model. After the identity mapping is introduced, the residual network model is more obvious to a change of the output, therefore, the identification accuracy and the identification efficiency of the plant physiological period may be greatly improved, and the identification accuracy and the identification efficiency of the plant are improved accordingly.

Figure 2:
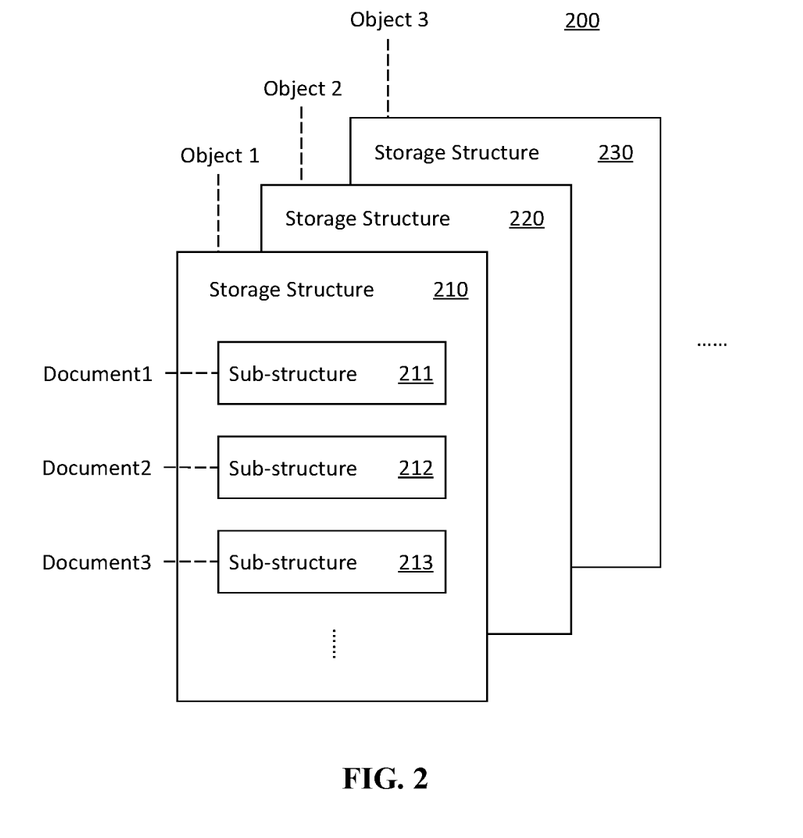
FIG. 2 is a schematic diagram schematically illustrating at least a portion of a document database used in the method according to an embodiment of the present disclosure.
Figure 3:
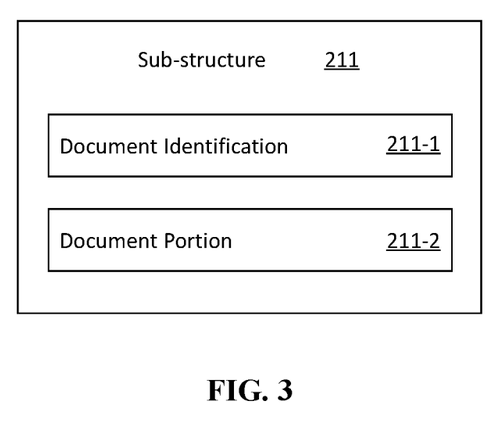
FIG. 3 is a schematic diagram schematically illustrating at least a portion of a document database used in the method according to an embodiment of the present disclosure.

Step 130 includes searching a document database 200 for a document corresponding to the identified object. For example, the search may be performed by a computing device. The configuration of the document database 200 is shown in FIGS. 2 and 3. The document database 200 includes storage structures (including storage structures 210 to 230, etc.) respectively established for each of a plurality of objects (including object 1 to object 3, etc.). In the step 130, the document database 200 is searched, and so long as the identified object is found in the document database 200, the storage structure corresponding to the object may be acquired, and the document corresponding to the object may be obtained from the storage structure. As shown in FIG. 2, each storage structure (taking storage structure 210 as an example) may include one or more sub-structures (e.g., sub-structures 211 to 213, etc.). The one or more sub-structures correspond to one or more documents (e.g., documents 1 to 3, etc.) that record the object, respectively. As shown in FIG. 3, each sub-structure (e.g., sub-structure 211) includes a document identification 211-1 and a portion 211-2 of the document where the object is recorded.

Document identification 211-1 is used to identify the document. The document identification 211-1 may be, for example, a name of the document (e.g., a book name, a paper title, etc.) and/or a serial number of the document (e.g., a serial number of a book (ISBN), a paper, a journal, etc.). The document identification 211-1 in the sub-structure 211 stored in the document database 200 may be stored in the form of text, or stored in the form of image(s), for example, a cover image, a home page image, a copyright page image, a publication information page image, or the like of the document may be stored.

The portion 211-2 of the document where the object is recorded may be used to indicate to the user a location of the portion in the document where the object is recorded, so that the user may look up the portion in the document. The portion may be also used to present to the user at least a part of the content of the portion or a summary of the portion, etc. For example, the portion 211-2 of the document where the object is recorded may include: a number of a chapter and/or page where the object is recorded; a number of a chapter and/or page where the object is recorded, and a number of a line where the object is recorded in the chapter and/or page; a number of a chapter and/or page where the object is recorded, and a number of a paragraph where the object is recorded in the chapter and/or page; a number of a chapter and/or page where the object is recorded, a number of a paragraph where the object is recorded in the chapter and/or page, and content in the chapter, page and/or paragraph; a number of a chapter and/or page where the object is recorded, and content in the chapter and/or page; or content of the portion of the document in which the object is recorded, wherein the content is stored in text and/or one or more images. The "content" in the portion 211-2 of the document where the object is recorded may be stored in the form of text, or may be stored in the form of images, e.g., an image of whole page or images of a plurality of pages where the object is recorded, or an image of a paragraph or a part of the paragraph of the page where the object is recorded.

An example of establishing the document database 200 may be as follows. A table of contents in each document is acquired, and whether or not the object is recorded in the document and a portion where the object is recorded are determined based on the table of contents. For example, if there is an entry related to the object in the table of contents, it is determined that the object is recorded in the document, and the chapter and/or page corresponding to the entry is determined as the portion the object is recorded. In addition, content included in the chapter and/or page corresponding to the entry may be further acquired and analyzed to further determine a more accurate location where the object is recorded, such as a sub-chapter number, a page number, a paragraph number, a line number, and the like. If it is determined that the object is recorded in the document, the document identification of the document may be acquired, and the document identification and the portion of the document where the object is recorded may be stored, in a corresponding relationship, as a sub-structure in the document database 200.

Another example of establishing the document database 200 may be as follows. Each document is acquired, and content analysis is performed on all contents in the document to determine whether the object is recorded in the document and a portion where the object is recorded. For example, if the name of the object (including the name of a certain level of classification of the object) appears in contents of a document, it may be determined that the object is recorded in the document. The portion where the name of the object appears may be determined as the portion where the object is recorded. For another example, if the name of the object appears in a document a predetermined number of times (for example, more than 3 times) within a predetermined range (for example, within 10 pages, within one chapter), it may be determined that the object is recorded in the document. The portion where the name of the object appears may be determined as the portion where the object is recorded. Then, the document identification of the document and the portion in which the object is recorded are stored, in a corresponding relationship, as one sub-structure in the document database 200.

In the above-described examples, the method of determining whether or not the object is recorded in the document and the portion where the object is recorded based on the table of contents is a method with a small amount of computation, and the portion where the object is recorded found by the method generally is a portion where the object is described in detail. The method of performing content analysis on contents of the document to determine whether or not the object is recorded in the document and the portion where the object is recorded is a method with a large amount of calculation, but the method may more comprehensively find out documents in which the object is recorded without omission. Those skilled in the art will appreciate that the methods described in the above two examples may be used in combination. For example, if there is no entry including the object in the table of contents, content analysis is performed on all contents in the document to determine whether or not the object is recorded in the document and the portion where the object is recorded. Thus, the advantages of both methods may be combined.

Step 140 includes displaying the object and information related to the document, for example, on a display screen of the display device. In an implementation, the object and the information related to the document may be displayed in regions. For example, the object may be displayed in one region and the document related information may be displayed in another region by splitting screen up and down, splitting screen left and right, splitting screen with diagonal lines, splitting screen arbitrarily, or the like. In another implementation, the two may be displayed separately in the foreground and background, for example, displaying the object in the foreground and displaying the document related information in the background, or displaying the document related information in the foreground and displaying the object in the background. The foreground display may be implemented, for example, by a floating display window. In yet another implementation, the object is displayed on the display screen, and an operable indicator (e.g., an outgoing line with the text "know more", a hand-shaped indicator indicating a user to perform a click operation, etc.) is displayed in a relevant region (e.g., a surrounding region of the object, a central region of the object, etc.) of the object. The document related information is displayed after the indicator is operated. One skilled in the art will appreciate that there may be one or more documents corresponding to the object. When there are a plurality of documents corresponding to one object, in any one of the three implementations described above, the plurality of documents may be respectively displayed in a plurality of regions of one screen, in a plurality of layered screens, or in a plurality of screens one of which may be linked to or nested with another, or the like.

Displaying the object includes displaying the image representing at least a part of the object acquired in the step 110, a specific image of the object identified in the step 120 (wherein specific image of the object refers to an image of the object that is different from the image acquired in the step 110, e.g., an image of the object in a picture book, or an image of the object recorded in the document found in the step 130), and/or text associated with an attribute of the object (e.g., a name of the identified object, including a name of a certain level of classification of the object).

Displaying information related to the document includes displaying part or all of the information in the sub-structures corresponding to the document in the document database 200. For example, the document identification and a number of a chapter and/or page where the object is recorded are displayed; the document identification and a number of a chapter and/or page where the object is recorded, and a number of a line where the object is recorded in the chapter and/or page are displayed; the document identification and a number of a chapter and/or page where the object is recorded, and a number of a paragraph where the object is recorded in the chapter and/or page are displayed; the document identification and a number of a chapter and/or page where the object is recorded, a number of a paragraph where the object is recorded in the chapter and/or page, and content in the chapter, page, and/or paragraph are displayed; the document identification and a number of a chapter and/or page where the object is recorded, and content in the chapter and/or page are displayed; or the document identification and content of the portion of the document in which the object is recorded are displayed. The content may be displayed in a number of ways, for example, displaying at least a part of the content in text; displaying at least a part of the content in an image; displaying a summary of the content in text; or displaying a summary of the content in an image.

Although not shown in FIG. 1, the method according to an embodiment of the present disclosure may further include a step of interacting with a user after the step 140. For example, the displayed information related to the document may be operated by the user (e.g., the method of the disclosure may receive an operation by the user on the displayed information), e.g., the user may be allowed to click to further view the detailed content. After being operated by the user, if the document is in an acquired state, e.g., the user (including the user's device, e.g., the electronic device for performing the step 140) has been authorized to view the document (e.g., the e-book has been purchased/borrowed, the journal has been downloaded, the paper has been authorized to be read by the user, etc.), the document is displayed to the user for example in a document-reading manner (e.g., jumping to an e-book reader, a journal viewing browser, or other applications capable of presenting the document in a document-reading manner, etc.).

If the document is not in an acquired state, information on sources from which the document may be acquired is displayed to facilitate the user to acquire the document. The information on sources from which the document may be acquired includes information on web pages, applications, merchants, and/or addresses (e.g., geographical addresses) etc. from which the document may be acquired. The method according to an embodiment of the present disclosure may further include, receiving an operation by the user on the displayed information on these sources, and after the displayed information on sources from which the document may be acquired is operated (e.g., after the user clicks on the displayed information on one of the plurality of sources), displaying the source. For example, displaying the source may include: linking to a page for purchasing the e-book in a certain application, linking to a page for borrowing the journal in a certain website, linking to a home page of a merchant from which the document may be acquired, linking to display an address of the merchant from which the document may be borrowed or purchased, etc.

At least part of the process in the method according to an embodiment of the present disclosure is described below by using a specific application as an example. For simplicity, in the example of this specific application, the object to which the identification and display is directed is an animal, and the documents contained in the document database are books. However, one skilled in the art will appreciate that the object for which the identification and display is directed may be any one of, a portion of, or a combination of more than one of the following: animals, plants, persons, scenery, nature, buildings, goods, food, medicines, and commodities. The documents contained in the document database may be any one of, a portion of, or a combination of more than one of the following: books, papers, journals, and manuals (e.g., pharmaceutical instructions, product instruction manuals, etc.). Those skilled in the art will appreciate that document referred to herein, such as books (including the above-mentioned "e-books"), papers, journals, and manuals, may include not only copies (e.g., where copyrights are granted) of publications that have been published (including issued, posted, printed, and produced) on a paper carrier and then are electronized or digitized, (e.g., by scanning, photographing, etc., to convert the original paper-carried publication into a picture, or by a text identification process to convert the original paper-carried publication into text, etc.), but also publications (and copies thereof) that have been published in an electronic form, such as text, picture, audio, video, etc.

Before the images are acquired for identification, a document database and a trained classification identification model are established. Books (or copies thereof) in an electronic form are acquired, text in table pages of each book is extracted to obtain a table of contents of each book, so as to determine whether any species of animals are recorded in the book according to the table of contents, and obtain portions where various species of animals are recorded. A document identification (e.g., a book title and/or an ISBN) of a book where a species of animal is recorded and a portion in which the species of animal is recorded (e.g., a location in the book where the species of animal is recorded and/or related content recorded in the book) are stored as a single sub-structure. If there are multiple books that record the species of animal, a plurality of such sub-structures are obtained, each corresponding to a book that records the species of animal. The plurality of such sub-structures are used as a storage structure corresponding to the species of animal. Such a storage structure is established for each of preset all species of animals. These storage structures respectively corresponding to the species of animals form a document database.

A certain number of image samples labeled with corresponding information are acquired for each species of animal, and one or more neural networks are trained with the image samples subjected to the labeling process so as to obtain a trained animal classification identification model whose output accuracy meets the requirement.

After a user shoots an image of an animal, the image is acquired by the method according to the embodiment of the present disclosure, and the species of the animal presented in the image is identified based on the trained animal classification and identification model. By searching the document database for the storage structure corresponding to the animal of the species, one or more books in which the animal of the species is recorded may be obtained, including the document identification of each book and the portion of the book where the animal of the species is described.

The identified species of the animal and the information related to one or more books in which the animal is recorded are displayed to the user on a display screen of an electronic device. These contents may be displayed on a plurality of pages, for example, the identified species of the animal and the image shoot by the user (or a representative image of the animal of the species) are displayed on a first page, a first book in which the animal of the species is recorded is displayed on a second page (the book may be a book having a stronger correlation with the animal of the species, for example, a book in which content on the animal is more than a threshold), a second book in which the animal is recorded is displayed on a third page (the book have a lower correlation with the animal than the first book), and so on. Each pages for displaying books, for example, the second and third pages, may display a cover and/or a title of the corresponding book, and text, picture, abstract of the portion where the animal is recorded, or a location of the portion in the book.

The user may obtain information related to all books in which the animal is recorded through page-turning browsing. If the user is interested in a book, the user may operate the page in which the book is displayed, for example, click on a specific area, icon, indicator, or the like. After being operated by the user, if the book is in an acquired state, for example, the user is authorized to read the book (including that the user has purchased, borrowed, been shared with the book, or the like), it is possible to jump to an interface of the electronic book reader on a display screen of the electronic device to present the book to the user. If the book is not in an acquired state, information on the sources from which the book may be acquired is displayed, so that the user can conveniently acquire the book. For example, it is possible to jump to a purchase page of the book after being operated by the user, or to display address information of a library (including an online library) from which the book may be borrowed and in-store information of the book, and the like.

Figure 4:
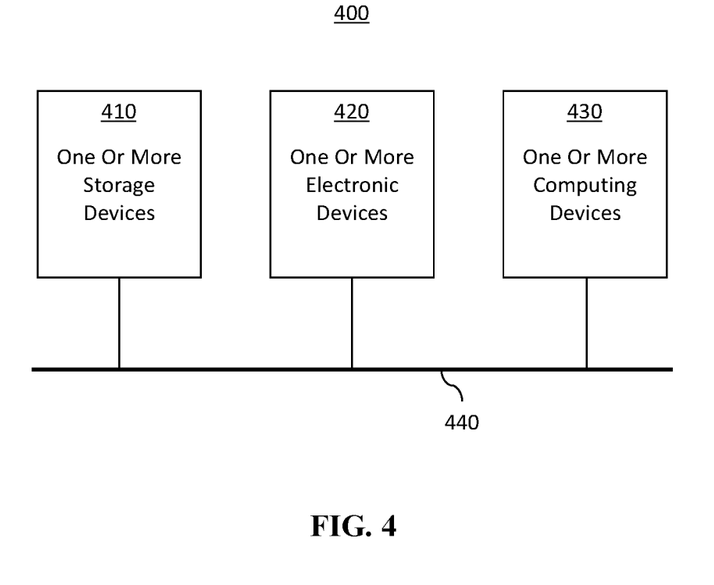
FIG. 4 is a block diagram schematically illustrating at least a portion of a system according to an embodiment of the present disclosure.

FIG. 4 is a block diagram schematically illustrating at least a portion of a system 400 according to one embodiment of the present disclosure. Those skilled in the art will appreciate that the system 400 is merely an example and should not be construed as limiting the scope of the present disclosure or the features described herein. In this example, the system 400 may include one or more storage devices 410, one or more electronic devices 420, and one or more computing devices 430, which may be interconnected through a network or bus 440. The one or more storage devices 410 may be configured to store the one or more document databases 200, and may also be configured to store the trained classification identification models. The one or more computing devices 430 may be configured to perform the above-described method, such as identifying an object, searching for a document corresponding to object, and the like. The one or more electronic devices 420 may be configured to acquire images including at least a part of the object, as well as display the object and information related to the document.

The network or bus 440 may be any wired or wireless network, and may include cables. The network or bus 440 may be a part of the Internet, World Wide Web, a particular intranet, a wide area network, or a local area network. The network or bus 440 may utilize standard communication protocols such as Ethernet, WiFi, and HTTP, proprietary protocols for one or more companies, and various combinations of the foregoing. The network or bus 440 may also include, but is not limited to, an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

Each of the one or more electronic devices 420 and the one or more computing devices 430 may be located at different nodes of the network or bus 440, and may be capable of communicating directly or indirectly with other nodes of the network or bus 440. Those skilled in the art will appreciate that the system 400 may also include other devices not shown in FIG. 4, with respective devices being located at respective nodes of the network or bus 440.

Further, while the one or more storage devices 410 is shown in the system 400 as separate blocks independent of the one or more electronic devices 420, and the one or more computing devices 430, it should be understood that the one or more storage devices 410 may actually be stored on any of the other entities 420, 430 included in the system 400.

Figure 5:
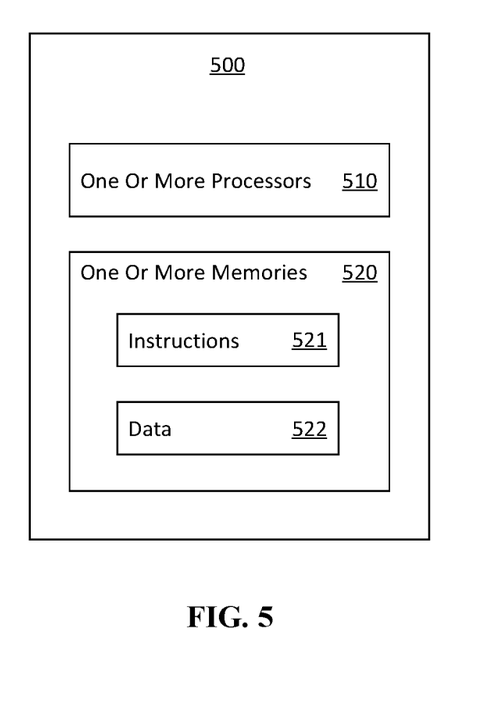
FIG. 5 is a block diagram schematically illustrating at least a portion of a system according to an embodiment of the present disclosure.

Each of the one or more electronic devices 420 and the one or more computing devices 430 may be configured similar to the system 500 shown in FIG. 5, i.e., having one or more processors 510, one or more memories 520, and instructions and data. Each of the one or more electronic devices 420 and the one or more computing devices 430 may be a personal computing device intended for use by a user or a business computer device used by an enterprise, and has all of the components typically used in conjunction with the personal computing device or the business computer device, such as a Central Processing Unit (CPU), a memory (e.g., RAM and internal hard drives) to store data and instructions, one or more I/O devices such as a display (e.g., a monitor having a screen, a touch screen, a projector, a television or other devices operable to display information), a mouse, a keyboard, a touch screen, a microphone, a speaker, and/or a network interface device, etc. The one or more electronic devices 420 may also include one or more cameras for capturing still images or recording video streams, and all components for connecting these elements to each other.

While the one or more of the electronic devices 420 may each include a full-sized personal computing device, it may alternatively include a mobile computing device capable of wirelessly exchanging data with a server over a network such as the Internet. The one or more electronic devices 420 may be, for example, a mobile telephone or a device such as a PDA with wireless support, a tablet PC, or a netbook capable of obtaining information via the internet. In another example, the one or more electronic devices 420 can be a wearable computing system.

FIG. 5 is a block diagram schematically illustrating at least a portion of a system 500 according to an embodiment of the present disclosure. The system 500 includes one or more processors 510, one or more memories 520, and other components (not shown) typically found in a device such as a computer. Each of the one or more memories 520 may store content accessible by the one or more processors 510, including instructions 521 that may be executed by the one or more processors 510, and data 522 that may be retrieved, manipulated, or stored by the one or more processors 510.

The instructions 521 may be any set of instructions to be executed directly by the one or more processors 510, such as machine code, or may be any set of instructions to be executed indirectly, such as scripts. The terms "instruction," "application," "process," "step," and "program" herein may be used interchangeably. The instructions 521 may be stored in an object code format to be directly processed by the one or more processors 510 or in any other computer language, including scripts or sets of separate source code modules that are interpreted as needed or compiled in advance. The instructions 521 may include instructions that cause, for example, the one or more processors 510 to act as the neural networks herein. The functions, methods, and routines of the instructions 521 are explained in more detail elsewhere herein.

The one or more memories 520 may be any temporary or non-transitory computer-readable storage medium capable of storing content accessible by the one or more processors 510, such as hard disk drive, memory card, ROM, RAM, DVD, CD, USB memory, writeable memory, read-only memory, and so forth. One or more of the one or more memories 520 may include a distributed storage system, wherein the instructions 521 and/or data 522 may be stored on a plurality of different storage devices which may be physically located at the same or different geographic locations. One or more of the one or more memories 520 may be connected to the one or more first devices 510 via a network, and/or may be directly connected to or incorporated into any of the one or more processors 510.

The one or more processors 510 may retrieve, store, or modify the data 522 according to the instructions 521. The data 522 stored in the one or more memories 520 may include the various images to be identified, the various image sample sets, and parameters for the various neural networks, etc., as described above. Other data not associated with the images or neural networks may also be stored in the one or more memories 520. For example, although the subject matter described herein is not limited by any particular data structure, it is also possible that the data 522 is stored in a computer register (not shown) as a table or XML document having many different fields and records and stored in a relational database. The data 522 may be formatted in any computing device readable format such as, but not limited to, binary value, ASCII, or unified code. Further, the data 522 may include any information sufficient to identify the related information, such as numbers, descriptive text, proprietary codes, pointers, references to data stored in other memories, such as at other network locations, or information used by a function to calculate related data.

The one or more processors 510 may be any conventional processor, such as a commercially available Central Processing Unit (CPU), a Graphics Processing Unit (GPU), or the like. Alternatively, the one or more processors 510 may also be a special purpose component, such as an Application Specific Integrated Circuit (ASIC) or other hardware-based processors. Although not required, the one or more of the processors 510 may include specialized hardware components to perform particular computing processes more quickly or efficiently, such as image processing of the images, etc.

Although the one or more processors 510 and the one or more memories 520 are schematically depicted in FIG. 5 as being within the same block, the system 500 may in fact include multiple processors or memories that may be present within the same physical enclosure or within different physical enclosures. For example, one of the one or more memories 520 may be a hard disk drive or other storage medium located in a different enclosure than the enclosure of each of the one or more computing devices (not shown) described above. Thus, the reference to the processor, computer, computing device, or memory should be understood to include the reference to a collection of processors, computers, computing devices, or memories that may or may not operate in parallel.

The term "A or B" used through the specification refers to "A and B" and "A or B" rather than meaning that A and B are exclusive, unless otherwise specified.

In the present disclosure, a reference to "one embodiment", "an embodiment" or "some embodiments" means that features, structures, or characteristics described in connection with the embodiment(s) are included in at least one embodiment, at least some embodiments of the present disclosure. Thus, the phrases "in an embodiment" and "in some embodiments" in the present disclosure do not mean the same embodiment(s). Furthermore, the features, structures, or characteristics may be combined in any suitable combination and/or sub-combination in one or more embodiments.

The term "exemplary", as used herein, means "serving as an example, instance, or illustration", rather than as a "model" that would be exactly duplicated. Any implementation described herein as exemplary is not necessarily to be construed as preferred or advantageous over other implementations. Furthermore, there is no intention to be bound by any expressed or implied theory presented in the preceding technical field, background, summary or detailed description.

The term "substantially", as used herein, is intended to encompass any slight variations due to design or manufacturing imperfections, device or component tolerances, environmental effects and/or other factors. The term "substantially" also allows for variation from a perfect or ideal case due to parasitic effects, noise, and other practical considerations that may be present in an actual implementation.

In addition, the foregoing description may refer to elements or nodes or features being "connected" or "coupled" together. As used herein, unless expressly stated otherwise, "connected" means that one element/node/feature is electrically, mechanically, logically or otherwise directly joined to (or directly communicates with) another element/node/feature. Likewise, unless expressly stated otherwise, "coupled" means that one element/node/feature may be mechanically, electrically, logically or otherwise joined to another element/node/feature in either a direct or indirect manner to permit interaction even though the two features may not be directly connected. That is, "coupled" is intended to encompass both direct and indirect joining of elements or other features, including connection with one or more intervening elements.

In addition, certain terminology, such as the terms "first", "second" and the like, may also be used in the following description for the purpose of reference only, and thus are not intended to be limiting. For example, the terms "first", "second" and other such numerical terms referring to structures or elements do not imply a sequence or order unless clearly indicated by the context.

Further, it should be noted that, the terms "comprise", "include", "have" and any other variants, as used herein, specify the presence of stated features, integers, steps, operations, elements, and/or components, but do not preclude the presence or addition of one or more other features, integers, steps, operations, elements, components, and/or groups thereof.

In the present disclosure, the terms "component" and "system" are intended to refer to a computer-related entity, or a hardware, a combination of a hardware and a software, a software, or an executing software. For example, a component may be, but not limited to, a process running on a processor, an object, an executing state, an executable thread, and/or a program, etc. By way of example, either an application running on one server or the server may be a component. One or more components may reside within an executing process and/or thread, and a component may be located on a single computer and/or distributed between two or more computers.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. However, other modifications, variations and alternatives are also possible. The description and drawings are, accordingly, to be regarded in an illustrative rather than in a restrictive sense.

Although some specific embodiments of the present disclosure have been described in detail with examples, it should be understood by a person skilled in the art that the above examples are only intended to be illustrative but not to limit the scope of the present disclosure. The embodiments disclosed herein can be combined arbitrarily with each other, without departing from the scope and spirit of the present disclosure. It should be understood by a person skilled in the art that the above embodiments can be modified without departing from the scope and spirit of the present disclosure. The scope of the present disclosure is defined by the attached claims.

What is claimed is:

1. A method for identifying an animal or plant, comprising the following processes performed by one or more computing devices:
    acquiring from an image acquisition device an image comprising a part of an animal or plant object via an electronic connection to the image acquisition device;
    identifying a species of the animal or plant object based on the image and a trained classification identification model;
    after the species of the animal or plant object is determined, searching a pre-established document database for a book that records the identified species of the animal or plant object via an electronic connection to a memory, wherein the pre-established document database is established to comprise a plurality of storage structures for respective plurality of animal or plant species, each of the plurality of storage structures storing a book that records a corresponding species of the animal or plant object, wherein the searching comprises:
        finding a target storage structure corresponding to the identified species of the animal or plant object in the document database; and
        acquiring a book that records the identified species of the animal or plant object from the target storage structure; and
    sending to a display device the species of the animal or plant object and the book via an electronic connection to the display device; and
    displaying the species of the animal or plant object, the image, an additional image of the species of the animal or plant object, and information related to the book by the display device, wherein the additional image is from the book.

2. The method according to claim 1, wherein each of the plurality of storage structures comprises one or more sub-structures corresponding respectively to one or more books in each of which the animal or plant is recorded, each of the sub-structures comprising:
    a document identification for identifying the book; and
    a portion of the book where the animal or plant is recorded.

3. The method according to claim 2, wherein the portion of the book in which the animal or plant is recorded comprises:
    a number of a chapter and/or page where the animal or plant is recorded;
    a number of a chapter and/or page where the animal or plant is recorded, and a number of a line where the animal or plant is recorded in the chapter and/or page;
    a number of a chapter and/or page where the animal or plant is recorded, and a number of a paragraph where the animal or plant is recorded in the chapter and/or page;
    a number of a chapter and/or page where the animal or plant is recorded, a number of a paragraph where the object is recorded in the chapter and/or page, and content in the chapter, page and/or paragraph;
    a number of a chapter and/or page where the animal or plant is recorded, and content in the chapter and/or page; or
    content of the portion of the book in which the animal or plant is recorded, wherein the content is stored in text and/or one or more images.

4. The method according to claim 2, further comprising: determining the portion of the book in which the animal or plant corresponding to the species of the animal or plant object is recorded according to a table of contents in the book.

5. The method according to claim 1, wherein displaying the species of the animal or plant object and the information related to the book comprises:
    displaying the species of the animal or plant object and the information related to the book in different regions;
    displaying the species of the animal or plant object in a foreground and displaying information related to the book in a background;
    displaying the information related to the book in the foreground and displaying the species of the animal or plant object in the background; or
    displaying the species of the animal or plant object and the animal or plant object, displaying an operable indicator in a relevant region of the animal or plant object, and displaying the information related to the book after the indicator is operated.

6. The method according to claim 5, wherein displaying the information related to the book comprises:
    displaying the document identification and a number of a chapter and/or page where the animal or plant corresponding to the species of the animal or plant object is recorded;
    displaying the document identification and a number of a chapter and/or page where the animal or plant corresponding to the species of the animal or plant object is recorded, and a number of a line where the animal or plant corresponding to the species of the animal or plant object is recorded in the chapter and/or page;
    displaying the document identification and a number of a chapter and/or page where the animal or plant corresponding to the species of the animal or plant object is recorded, and a number of a paragraph where the animal or plant corresponding to the species of the animal or plant object is recorded in the chapter and/or page;
    displaying the document identification and a number of a chapter and/or page where the animal or plant corresponding to the species of the animal or plant object is recorded, a number of a paragraph where the animal or plant corresponding to the species of the animal or plant object is recorded in the chapter and/or page, and content in the chapter, page, and/or paragraph;
    displaying the document identification and a number of a chapter and/or page where the animal or plant corresponding to the species of the animal or plant object is recorded, and content in the chapter and/or page; or displaying the document identification and content of the portion of the book in which the animal or plant corresponding to the species of the animal or plant object is recorded.

7. The method according to claim 6, wherein displaying the content comprises:
displaying at least a portion of the content in text;
displaying at least a portion of the content in one or more images;
displaying a summary of the content in text; or
displaying a summary of the content in one or more images.

8. The method according to claim 1, wherein the acquiring the image does not involve acquiring an image of a book.

9. The method according to claim 1, further comprising the following processes performed by the display device:
receiving an operation on the displayed information related to the book, and in response to receiving the operation,
if the book is in an acquired state, displaying the book; and
if the book is not in an acquired state, displaying information on sources from which the book can be acquired.

10. The method according to claim 9, wherein
the acquired state comprises a state of having been purchased, having been borrowed, having been downloaded, and/or having been authorized to be read, and
the sources comprise: web pages, applications, merchants, and/or addresses.

11. The method according to claim 9, further comprising the following processes performed by the display device:
receiving an operation on the displayed information on the sources, and in response to receiving an operation on one of the information on one of the sources, displaying the one of the sources.

12. A system for identifying and displaying an animal or plant, comprising:
a memory configured to store a pre-established document database and a trained classification identification model, wherein the pre-established document database is established to comprise a plurality of storage structures for respective a plurality of animal or plant species, each of the plurality of storage structures storing a book that records a corresponding species of animal or plant;
an electronic device configured to acquire an image comprising a part of an animal or plant object; and
a computing device configured to:
acquire from the electronic device the image via an electronic connection to the electronic device;
identify a species of the animal or plant object based on the image and the trained classification identification model; and
search, after the species of the animal or plant object is determined, the document database for a book that records the identified species of the animal or plant object via an electronic connection to the memory wherein the search comprises:
finding a target storage structure corresponding to the identified species in the document database; and
acquiring a book that records the identified species from the target storage structure; and
send to the electronic device the species of the animal or plant object and the book via the electronic connection to the electronic device;
wherein the electronic device is further configured to display the species of the animal or plant object, the image, an additional image of the species of the animal or plant object, and information related to the book, wherein the additional image is from the book.

13. The system according to claim 12, wherein the storage structure comprising one or more sub-structures corresponding respectively to one or more books in each of which the animal or plant is recorded, each of the sub-structures comprising:
a document identification for identifying the book; and
a portion of the book where the animal or plant is recorded.

14. The system according to claim 13, wherein the portion of the book in which the animal or plant is recorded comprises:
a number of a chapter and/or page where the animal or plant is recorded;
a number of a chapter and/or page where the animal or plant is recorded, and a number of a line where the animal or plant is recorded in the chapter and/or page;
a number of a chapter and/or page where the animal or plant is recorded, and a number of a paragraph where the animal or plant is recorded in the chapter and/or page;
a number of a chapter and/or page where the animal or plant is recorded, a number of a paragraph where the animal or plant is recorded in the chapter and/or page, and content in the chapter, page, and/or paragraph;
a number of a chapter and/or page where the animal or plant is recorded, and content in the chapter and/or page; or
content of the portion of the book in which the animal or plant is recorded, wherein the content is stored in text and/or one or more images.

15. The system according to claim 12, wherein the electronic device is further configured to:
display the species of the animal or plant object and the book in different regions;
display the species of the animal or plant object in a foreground and display the book in a background;
display the book in the foreground and display the species of the animal or plant object in the background; or
display the species of the animal or plant object, display an operable indicator in a relevant region of the animal or plant object, and display the book after the indicator is operated.

16. The system according to claim 15, wherein the electronic device is configured to display the information related to the book by:
displaying the document identification and a number of a chapter and/or page where the animal or plant corresponding to the species of the animal or plant object is recorded;
displaying the document identification and a number of a chapter and/or page where the animal or plant corresponding to the species of the animal or plant object is recorded, and a number of a line where the animal or plant corresponding to the species of the animal or plant object is recorded in the chapter and/or page;
displaying the document identification and a number of a chapter and/or page where the animal or plant corresponding to the species of the animal or plant object is recorded, and a number of a paragraph where the animal or plant corresponding to the species of the animal or plant object is recorded in the chapter and/or page;

displaying the document identification and a number of a chapter and/or page where the animal or plant corresponding to the species of the animal or plant object is recorded, a number of a paragraph where the animal or plant corresponding to the species of the animal or plant object is recorded in the chapter and/or page, and content in the chapter, page, and/or paragraph;

displaying the document identification and a number of a chapter and/or page where the animal or plant corresponding to the species of the animal or plant object is recorded, and content in the chapter and/or page; or displaying the document identification and content of the portion of the book in which the animal or plant corresponding to the species of the animal or plant object is recorded.

17. The system according to claim 16, wherein the electronic device is configured to display the content by:

displaying at least a portion of the content in text;

displaying at least a portion of the content in one or more images;

displaying a summary of the content in text; or displaying a summary of the content in one or more images.

18. The system according to claim 12, wherein the acquiring the image does not involve acquiring an image of a book.

19. The system according to claim 12, wherein, the electronic device is further configured to: receive an operation on the displayed information related to the book, and in response to receiving the operation, if the book is in an acquired state, display the book; and if the book is not in an acquired state, display information on sources from which the book can be acquired, receive an operation on the displayed information on the sources, and in response to receiving an operation on the information on one of the sources, display the one of the sources.

* * * * *